(12) United States Patent
Lee et al.

(10) Patent No.: US 8,574,736 B2
(45) Date of Patent: Nov. 5, 2013

(54) HYBRID-TYPED ELECTRODE ASSEMBLY OF CAPACITOR-BATTERY STRUCTURE

(75) Inventors: Hyang Mok Lee, Daejeon (KR); Oh Young Hyun, Daejeon (KR); Kiwoong Kim, Daejeon (KR); Sung-Mok Lim, Seoul (KR)

(73) Assignee: LG Chem, Ltd. (KR)

( * ) Notice: Subject to any disclaimer, the term of this patent is extended or adjusted under 35 U.S.C. 154(b) by 601 days.

(21) Appl. No.: 12/309,780

(22) PCT Filed: Jul. 27, 2007

(86) PCT No.: PCT/KR2007/003613
§ 371 (c)(1),
(2), (4) Date: Aug. 19, 2009

(87) PCT Pub. No.: WO2008/016236
PCT Pub. Date: Feb. 7, 2008

(65) Prior Publication Data
US 2010/0075210 A1    Mar. 25, 2010

(30) Foreign Application Priority Data
Jul. 31, 2006   (KR) .......................... 10-2006-0071830

(51) Int. Cl.
*H01M 4/00*   (2006.01)
(52) U.S. Cl.
USPC .............. 429/94; 429/122; 429/152; 429/164
(58) Field of Classification Search
USPC .......................................... 429/122, 152, 164
See application file for complete search history.

(56) References Cited

U.S. PATENT DOCUMENTS

| | | | |
|---|---|---|---|
| 5,481,174 A * | 1/1996 | Martin et al. ................. | 320/129 |
| 2005/0031954 A1 * | 2/2005 | Meitav et al. ................. | 429/210 |
| 2006/0263649 A1 * | 11/2006 | Sohn ................................. | 429/7 |
| 2006/0275661 A1 * | 12/2006 | Kim et al. ..................... | 429/217 |

FOREIGN PATENT DOCUMENTS

| | | |
|---|---|---|
| JP | 2000-308909 A | 11/2000 |
| JP | 2002118036 A | 4/2002 |
| JP | 2003-148759 A | 5/2003 |
| JP | 2004273444 A | 9/2004 |
| JP | 2004-355823 A | 12/2004 |
| JP | 2005294780 A | 10/2005 |
| JP | 2006-140138 A | 6/2006 |
| KR | 10-19990063773 A | 7/1999 |
| KR | 1020000050974 A | 8/2000 |
| KR | 2001-0082058 A | 8/2001 |
| KR | 2001-0082059 A | 8/2001 |
| KR | 2001-0082060 A | 8/2001 |
| KR | 1020030027396 A | 7/2003 |
| WO | 01/59868 A1 | 8/2001 |

* cited by examiner

*Primary Examiner* — Jane Rhee
(74) *Attorney, Agent, or Firm* — Lerner, David, Littenberg, Krumholz & Mentlik, LLP

(57) ABSTRACT

Disclosed herein are a hybrid type electrode assembly including a plurality of electrode groups that can be charged and discharged, wherein the respective electrode groups are constructed in a structure in which a cathode and an anode are opposite to each other while a separator is disposed between the cathode and the anode, and at least one of the electrode groups is a capacitor type electrode group, and a secondary battery including the same. In the hybrid type electrode assembly according to the present invention, a coupled system of a capacitor and a secondary battery is embodied in a single cell through a simplified manufacturing process. Consequently, the present invention has the effect of reducing the manufacturing costs of the battery cell and improving the pulse charge and discharge characteristics without the degeneration of capacity.

11 Claims, 4 Drawing Sheets

HYBRID-TYPED ELECTRODE ASSEMBLY OF CAPACITOR-BATTERY STRUCTURE

CROSS REFERENCE TO RELATED APPLICATIONS

The present application is a national phase entry under 35U.S.C. §371 of International Application No. PCT/KR2007/003613, filed Jul. 27, 2007, published in English, which claims the benefit of Korean Patent Application No. KR10-2006-0071830, filed Jul. 31, 2006. The disclosures of said applications are incorporated by reference herein.

FIELD OF THE INVENTION

The present invention relates to a hybrid type electrode assembly including a plurality of electrode groups that can be charged and discharged, wherein the respective electrode groups are constructed in a structure in which a cathode and an anode are opposite to each other while a separator is disposed between the cathode and the anode, and at least one of the electrode groups is a capacitor type electrode group, and a secondary battery including the same.

BACKGROUND OF THE INVENTION

As mobile devices have been increasingly developed, and the demand of such mobile devices has increased, the demand of secondary batteries has also sharply increased as an energy source for the mobile devices. Among them is a lithium secondary battery having a high energy density and a high discharge voltage, on which much research has been carried out and which is now commercialized and widely used.

However, the secondary battery has a problem in that the charge and discharge efficiency of the secondary battery due to an instantaneous high current is low although the secondary battery has a high energy density. In order to solve the above-mentioned problem of the secondary battery, research and development has been recently made on a technology for systematically coupling an electric double-layer capacitor (EDLC) to a conventional lithium ion polymer battery (LIPB).

On the other hand, a global system for mobile communication (GSM), which is widely adopted by European mobile phone manufacturing companies, requires the supply of a high current for a short period of time during a discharge cycle. When the GSM is adopted, however, the capacity of a conventional secondary battery is seriously reduced during the high-rate charge and discharge of the secondary battery, and therefore, the solution to this problem is very urgent.

Generally, a capacitor is a device that accumulates electric charges during the application of voltage to the capacitor. The capacitor exhibits high output characteristics. A representative example of the capacitor is an electrochemical capacitor, which may be classified as an electric double-layer capacitor (EDLC) or a pseudo capacitor. The electric double-layer capacitor is a device that stores electric charges by charging ions on an electrolyte and electrons on an electrode at an electric double-layer formed at the interface between the electrode and the electrolyte. The pseudo capacitor is a device that stores electrons adjacent to the surface of an electrode material using a Faraday reaction.

The electric double-layer capacitor includes an equivalent circuit constructed in a structure in which a double-layer capacitance and an equivalent series resistance (ESR) are connected in series with each other. In this case, the double-layer capacitance is proportional to the surface area of the electrode, and the ESR is the sum of the resistance of the electrode, the resistance of an electrolytic solution, and the resistance of the electrolyte in pores of the electrode. The instantaneous high-output characteristics of the electric double-layer capacitor are excellent; however, the energy density and storage characteristics of the electric double-layer capacitor are poor as compared to the conventional secondary battery.

A hybrid type battery, constructed in a structure in which the capacitor, having the above-described characteristics, is coupled to a secondary battery, has an increased instantaneous output and a high energy density. Generally, however, the hybrid type battery is manufactured by interconnecting the secondary battery and the capacitor, which are separated from each other. Consequently, the manufacturing process of the hybrid type battery is complicated, and the installation space of the hybrid type battery is increased, with the result that the minimization of the battery is not accomplished.

In this connection, there has been proposed an electricity storage apparatus constructed in a structure in which a capacitor is simply included in a battery having an acid electrolyte, especially an electrochemically active polymer, applied to at least one side of a cathode and an anode as an electrode active material. However, it is structurally difficult to manufacture this apparatus, with the result that it is difficult to mass-produce the apparatus. Furthermore, the acid electrolyte is used as the electrolyte. Consequently, when electrodes for a secondary battery, such as lithium cobalt oxide ($LiCoO_2$) and graphite, are applied to the apparatus, the cycle degeneration of the apparatus occurs.

On the other hand, a carbon material is generally used as the electrode material for the electric double-layer capacitor. In order for the carbon material to exhibit excellent electric double-layer capacitor characteristics, it is required that (i) the carbon material includes a large number of pores to provide a large specific surface area, (ii) the carbon material has a high conductivity, and therefore, when the electrode is manufactured with the carbon material, the carbon material has a low electrode resistance, and (iii) the pores of the carbon material have a sufficiently large size, the connectivity between the pores of the carbon material is excellent, whereby the surfaces of the pores are easily wetted, by the electrolyte solution, to form a wide electric double layer, and the movement of the electrolyte ions is easy, whereby the charge and discharge are rapidly carried out.

For the conventional capacitor, active carbon is used as the electrode material in order to satisfy the above-mentioned conditions. However, the active carbon is relatively expensive, with the result that the manufacturing costs of the capacitor are increased, and therefore, it is difficult to mass-produce the conventional capacitor.

Consequently, there is a high necessity for a technology that is capable of fundamentally solving the above-mentioned several problems.

SUMMARY OF THE INVENTION

Therefore, the present invention has been made to solve the above-mentioned problems, and other technical problems that have yet to be resolved.

Specifically, it is an object of the present invention to provide a hybrid type electrode assembly wherein a coupled system of a capacitor and a secondary battery is embodied in a single cell, whereby the hybrid type electrode assembly is manufactured through a simplified manufacturing process while the hybrid type electrode assembly has a more compact structure.

It is another object of the present invention to provide a hybrid type electrode assembly wherein the kinds of electrode materials available for a capacitor are increased, whereby the hybrid type electrode assembly is manufactured such that the hybrid type electrode assembly exhibits desired battery characteristics while the manufacturing costs of the hybrid type electrode assembly are decreased.

It is a further object of the present invention to provide a secondary battery including the hybrid type electrode assembly, whereby the secondary battery has a desired high output, a high energy density, and continuous charge and discharge characteristics.

In accordance with one aspect of the present invention, the above and other objects can be accomplished by the provision of an electrode assembly including a plurality of electrode groups that can be charged and discharged, wherein the respective electrode groups are constructed in a structure in which a cathode and an anode are opposite to each other while a separator is disposed between the cathode and the anode, and at least one of the electrode groups is a capacitor type electrode group.

Specifically, the capacitor type electrode groups, having relatively high-rate discharge characteristics, are coupled between the plurality of electrode groups, having high energy density and charge and discharge characteristics, whereby the battery characteristics are complemented between them.

Based on the structure in which the electrode assembly that can be charged and discharged is mounted in a battery case (external structure), the electrode assembly may be classified as a cylindrical electrode assembly or a plate-shaped electrode assembly. Based on the stacking structure of the electrode assembly (internal structure), on the other hand, the electrode assembly may be classified as a jelly-roll type electrode assembly or a stacking type electrode assembly.

The jelly-roll type electrode assembly may be constructed in a cylindrical structure in which a long-sheet type cathode and a long-sheet type anode are stacked, while a separator is disposed between the cathode and the anode, and the cathode, the separator, and the anode are wound into the form of a circle in section. Alternatively, the jelly-roll type electrode assembly may be constructed in a plate-shaped structure in which the cathode, the separator, and the anode are wound in the cylindrical structure, and then the cylindrical structure is pressed in the lateral direction. On the other hand, the stacking type electrode assembly may be constructed in a plate-shaped structure in which a cathode and an anode, which are cut into a predetermined size, are sequentially stacked, while a separator is disposed between the cathode and the anode.

Preferably, the electrode assembly is constructed in a complex type structure (stacking/folding type structure) in which bicells or full cells, as unit cells, are constructed in the stacking structure, and the bicells or the full cells are sequentially wound, while the bicells or the full cells are located on a long separation film (separation sheet), such that the bicells or the full cells are arranged approximately in the plate-shaped structure.

Each full cell is a unit cell constructed in a cathode/separator/anode structure. Specifically, the full cell is a cell having a cathode and an anode positioned at the opposite sides thereof, respectively. For example, the full cell may be either a cell having a cathode/separator/anode structure, which is a basic structure, or a cell having a cathode/separator/anode/separator/cathode/separator/anode structure. In order to construct an electrochemical cell, such as a secondary battery, using the full cell, it is necessary to stack a plurality of full cells one on another, such that the cathodes and the anodes face each other, while a separation film is disposed between the full cells.

On the other hand, each bicell is a cell having identical electrodes positioned at the opposite sides thereof. For example, the bicell may be a cell constructed in a cathode/separator/anode/separator/cathode structure or a cell constructed in an anode/separator/cathode/separator/anode structure. In order to construct an electrochemical cell, including a secondary battery, using the bicell, it is necessary to stack a plurality of bicells, such that bicells constructed in a cathode/separator/anode/separator/cathode structure and bicells constructed in an anode/separator/cathode/separator/anode structure face each other, while a separation film is disposed between the bicells.

The details of the stacking/folding type electrode assembly are disclosed in Korean Patent Application Publication No. 2001-0082058, No. 2001-0082059, and No. 2001-0082060, which have been filed in the name of the applicant of the present patent application. The disclosures of the above-mentioned patent publications are hereby incorporated by reference as if fully set forth therein.

Preferably, the electrode assembly according to the present invention is constructed in a stacking/folding type structure including the above-described full cell or bicell type unit cells as the electrode groups. In the stacking/folding type electrode assembly, the capacitor type electrode group is used as a unit cell, like the full cell or the bicell. Consequently, the handling of the capacitor type electrode group is easy during the assembly process of the electrode assembly, and the structural stability of the manufactured electrode assembly is excellent.

According to the present invention, at least one of the unit cells (electrode groups) of the electrode assembly is constructed as a capacitor type unit cell (electrode group). Consequently, it is possible to embody a coupled system of a capacitor and a secondary battery in a single cell. Also, the electrode assembly according to the present invention is manufactured by a process substantially identical to the process for manufacturing a conventional electrode assembly for a secondary battery, although the electrode assembly is constructed in a structure including two kinds of electrode groups (secondary battery type electrode groups and capacitor type electrode groups). Consequently, it is very easy to apply the electrode assembly according to the present invention to mass production, and it is possible to restrain the cycle degeneration of the electrode assembly.

The capacitor type unit cell may be constructed in a structure in which a separator is disposed between a cathode and an anode having a carbon-based material applied to a metal sheet. According to circumstances, the capacitor type unit cell may be constructed in a bicell structure or a full cell structure. In addition, the capacitor type unit cell may be constructed in a single electrode structure.

A representative example of the capacitor type unit cell is a unit cell of an electric double-layer capacitor. When a direct-current voltage is applied to a pair of solid electrodes, which is located in an electrolyte ion solution, negative (−) ions are electrostatically induced to positively (+) polarized electrode, and positive (+) ions are electrostatically induced to negatively (−) polarized electrode, with the result that an electric double layer is formed at the interface between the electrodes and the electrolyte. The capacity of the stored charge is calculated by Equation 1 below.

$$C = \frac{\varepsilon}{4\pi\sigma}\int ds \qquad (1)$$

In Equation 1 above, $\in$ is a dielectric constant, a a radius of electrolyte ions, and S a specific surface area.

The factors deciding the capacity of the electric double-layer capacitor are as follows. The greater the specific surface area is, the greater the dielectric constant of the electrolyte is, and the less the radius of the ions is during the formation of the double layer, as can be seen from Equation 1 above, the greater the capacity of the electric double-layer capacitor is. In addition, the capacity of the electric double-layer capacitor may be decided based on the internal resistance (ESR) of the electrodes, the relationship between the pore distribution of the electrodes and the electrolyte ions, withstanding voltage, etc.

The electric double-layer capacitor includes electrodes, a separator, an electrolyte, and current collectors. The core of the capacitor is the selection of a material for the electrodes. It is required for the electrode material to have a high electric conductivity, a large specific surface area, and a high electrochemical stability, and is inexpensive. Consequently, the capacitor type unit cell may be constructed in a structure in which a separator is disposed between a cathode and an anode having a carbon-based material applied to a metal sheet.

Active carbon is generally used as the carbon-based material. In addition, graphite may be used as the carbon-based material. For the active carbon, a plurality of pores are distributed in the active carbon, and therefore, it is possible to form an electric double layer having a high charge capacity.

On the other hand, the graphite has been known to have a limit to be generally used as the electrode material of the capacitor because of the low charge capacity due to the small specific surface area thereof although the graphite is inexpensive. However, the hybrid type electrode assembly according to the present invention complements output energy through the capacitor, when a secondary battery, including the hybrid type electrode assembly, is discharged for a short period of time in a high current state, during the pulse discharge of the secondary battery. Consequently, the use of a small-sized capacitor is out of the question, and therefore, it is possible to use graphite having a small specific surface area as the electrode material of the capacitor type electrode groups. Also, the electrode material of the capacitor type electrode groups is graphite, and therefore, the cycle degeneration does not occur even when a conventional lithium electrolyte is used as the electrolyte.

The reason why the graphite can be used as the material of the capacitor type electrode groups will be described in detail below.

As previously described, the global system for mobile communication (GSM), which is a pulse discharge system adopted by some mobile manufacturing companies, is a system in which a high current of 1700 mA is discharged for 0.6 ms, and a current of 100 mA is discharged for 4 ms, which constitute one cycle, and the discharge process is repeated. According to the present invention, the output of the battery is complemented by the capacitor in a time section of 0.6 ms in which the high current of 1700 mA is discharged. The charge $Q_1$ necessary in the output section is calculated as represented by Equation 2 below.

$$\text{Necessary charge }(Q_1)=1700\ mA\times 0.6\ ms=0.00102\ (C)=1\ mC \qquad (2)$$

The charge of generally known graphite powder per unit surface area is 35 $\mu F/cm^2$.

Also, when the behavior of electric potential due to the charge and discharge of the secondary battery is 3 to 4.2 V, the potential difference $\Delta V$ is 1.2 V.

When the capacitance necessary for the capacitor is calculated using Equation 3 below, a value calculated by Equation 4 below is obtained.

$$Q = C_p \times V\max(\Delta V) \qquad (3)$$

$$C_p = 0.00102\ C/1.2\ V = 850\ \mu F \qquad (4)$$

As can be seen from Equation 4 above, the necessary capacitance $C_p$ is 850 $\mu F$. When it is divided by the charge of graphite per unit surface area, 35 $\mu F/cm^2$, the necessary surface area is simply 24.2 $cm^2$. In consideration of a fact that the specific surface area of graphite is 3.5 $m^2/g$, the graphite is available as the electrode material of the capacitor type electrode group according to the present invention, although the graphite has a specific surface area less than that of active carbon.

The remaining unit cells (unit cells for a secondary battery), excluding the capacitor type unit cells, of the stacking/folding type electrode assembly may include transition metal oxide, as a cathode active material, and a carbon-based material, as a anode active material. In a preferred embodiment, the unit cells for the secondary battery is constructed in a structure in which aluminum (Al) foil is used as a cathode plate, copper (Cu) foil is used as an anode plate, and $LiCoO_2$ and graphite, as active materials, are applied to the surfaces of the cathode and anode plates, respectively.

The stacking/folding type electrode assembly is constructed in a structure in which a plurality of unit cells are sequentially wound, while the unit cells are located on a long separation film, such that the unit cells are stacked. Consequently, when the unit cells exhibiting a relatively high penetration resistance (penetration restraint) are located at the outermost position of the stacking structure, the occurrence of a short circuit in the battery due to a needle-shaped piercing member is restrained to some extent. The experiments carried out by the inventors of the present application revealed that a carbon-based material constituting an anode active material of a general lithium secondary battery had a higher penetration resistance than that of lithium transition metal oxide constituting a cathode active material. In consideration of this respect, the capacitor type unit cell, both the cathode and anode of which are made of a carbon-based material, exhibits a relatively high penetration resistance.

In a preferred embodiment, therefore, the uppermost unit cell and the lowermost unit cell of the stacking structure are capacitor type unit cells.

In accordance with another aspect of the present invention, there is provided a secondary battery including the electrode assembly with the above-stated construction.

The secondary battery is constructed in a structure in which a chargeable and dischargeable electrode assembly is mounted in a battery case while the electrode assembly is impregnated with an ion-containing electrolyte. Especially, the electrode assembly according to the present invention is preferably applied to a secondary battery using a plate-shaped battery case, which has a small mechanical strength, and therefore, may be easily deformed when the secondary battery drops or external impacts are applied to the secondary battery.

The secondary battery is preferably a lithium secondary battery having a high energy density, a high discharge voltage, and a high output stability. Among them, a lithium ion polymer secondary battery is more preferably used because the lithium ion polymer secondary battery has a low possibility of electrolyte leakage, is lightweight, is manufactured with low costs, and can be easily constructed in various forms. Components constituting the lithium secondary battery and a method of manufacturing the lithium secondary battery are well known in the art to which the present invention pertains, and therefore, a detailed description thereof will not be given.

Preferably, the secondary battery according to the present invention is used in a device that is charged and discharged in a pulse charge and discharge mode. Especially, the secondary battery is more effectively used in a device adopting a GSM charge and discharge mode.

As previously described, a high current is discharged for a short period of time in the GSM mode. Consequently, the GSM mode causes the capacity degeneration of a conventional lithium ion battery or a conventional lithium ion polymer battery. However, the secondary battery according to the present invention complements the output energy used while the high current is discharged for a short period of time, through the use of the capacitor, thereby preventing the capacity degeneration of the battery during the pulse discharge of the battery.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, a preferred embodiment of the present invention will be described in detail with reference to the accompanying drawings. It should be noted, however, that the scope of the present invention is not limited by the illustrated embodiment.

Figure 1:
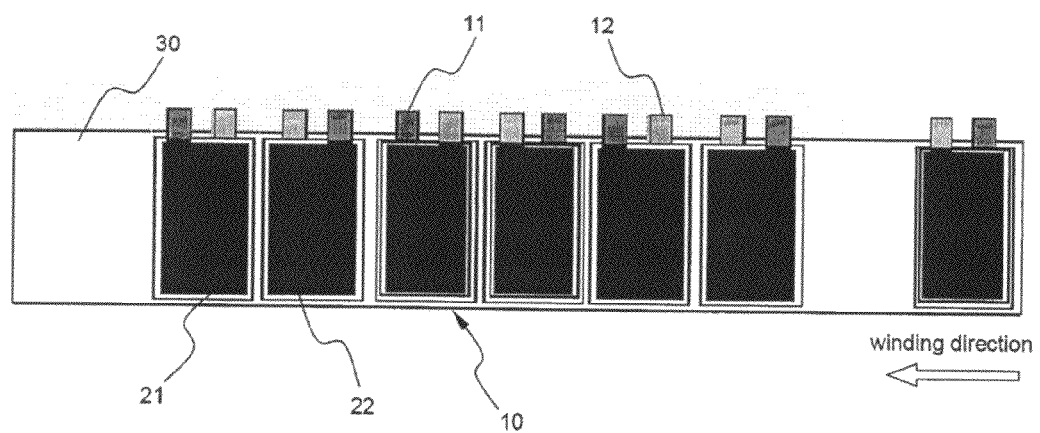
FIG. 1 is a plan view illustrating an electrode assembly according to a preferred embodiment of the present invention before the electrode assembly is assembled.
Figure 2:
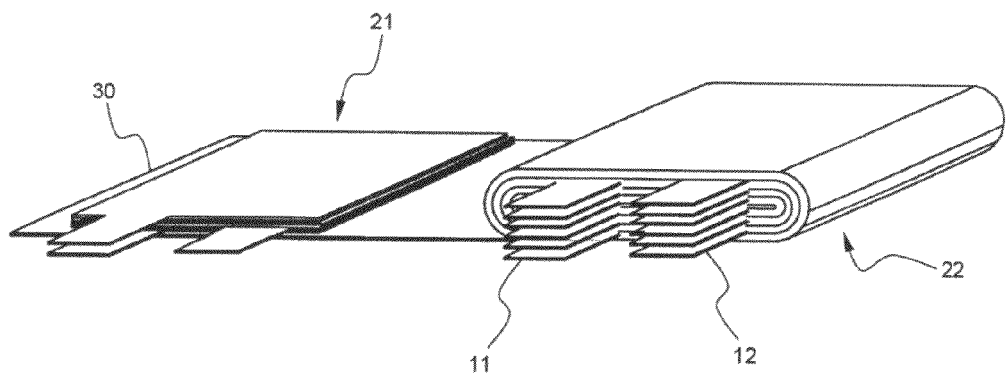
FIG. 2 is a perspective view illustrating a process for assembling the electrode assembly according to the present invention.

FIG. 1 is a plan view illustrating an electrode assembly according to a preferred embodiment of the present invention before the electrode assembly is assembled, and FIG. 2 is a perspective view illustrating a process for assembling the electrode assembly according to the present invention.

Referring first to FIG. 1, a plurality of bicells 10, each of which has a cathode (anode)/separator/anode (cathode)/separator/cathode (anode) stacking structure, are located on a long continuous separation film 30. The bicells 10 are appropriately arranged such that the cathodes and the anodes are opposite to each other at the stacking interface of the bicells 10 during the winding process of the cathode bicells and the anode bicells. At this time, capacitor type unit cells 21 and 22 are used as two unit cells that are located at a winding end region in the winding direction.

FIG. 2 illustrates the electrode assembly just before the winding process of the bicells is completed. After the winding process of the bicells is completed, cathode terminals 11 and anode terminals 12 are located at the same side of the electrode assembly. On the other hand, the two capacitor type unit cells 21 and 22, which are located at the winding end region in the winding direction as shown in FIG. 1, are located at the uppermost end and the lowermost end of the electrode assembly during the final winding process of the bicells. Consequently, the resistance against the penetration of a needle-shaped body into the electrode assembly is increased while the efficiency of the electrode assembly is improved.

Figure 3:
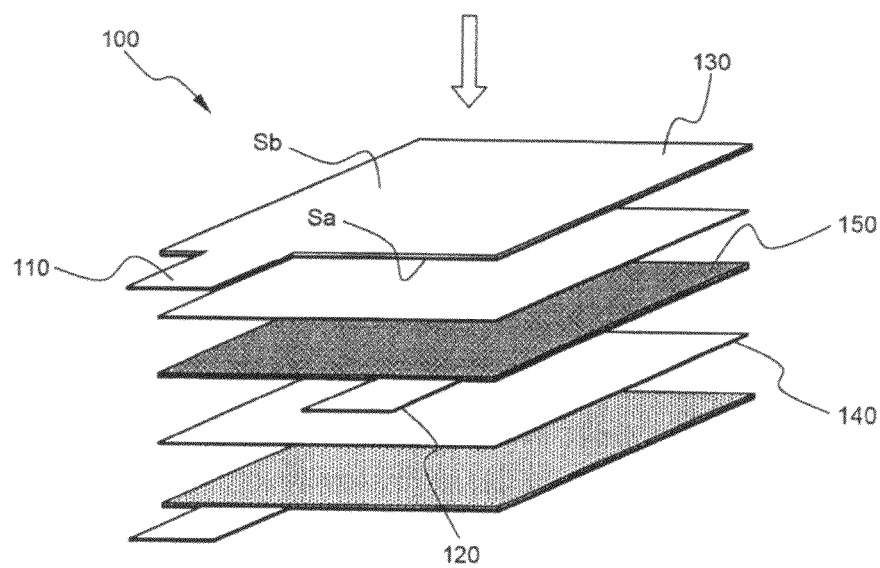
FIG. 3 is an exploded perspective view illustrating a capacitor type unit cell according to a preferred embodiment of the present invention.

FIG. 3 is an exploded perspective view typically illustrating a capacitor type unit cell according to a preferred embodiment of the present invention.

Referring to FIG. 3, the capacitor type unit cell 100 is constructed in a structure in which a cathode plate 130, a separator 140, an anode plate 150, another separator 140, and another cathode plate 130, which are cut into a predetermined size, are sequentially stacked. An electrode tab 110 protrudes from one side of each cathode plate 130, and an electrode tab 120 protrudes from one side of the anode plate 150. Each separator 140 is disposed between the corresponding cathode plate 130 and the anode plate 150. Each cathode plate 130 is made of aluminum (Al) foil, and the anode plate 150 is made of copper (Cu) foil. Graphite, as an active material, is applied to the electrode plates 130 and 150.

However, when the capacitor type unit cell 100 is opposite to the general bicells 10 (see FIG. 1) for a secondary battery in the direction indicated by an arrow shown in FIG. 3, during the winding process as shown in FIG. 1, graphite is applied to the inner surface Sa of the opposite cathode plate 130, not the outer surface Sb of the opposite cathode plate 130. Consequently, the interaction between the capacitor type unit cell 100 and the general bicells for the secondary battery is maximally restrained.

A unit cell having cathodes located at opposite sides thereof, as shown in FIG. 3, may be referred to as a capacitor type cathode unit cell. On the other hand, a unit cell having anodes located at opposite sides thereof may be referred to as a capacitor type anode unit cell. When a stacking/folding type electrode assembly is constructed in a fashion as shown in FIG. 1, the capacitor type cathode unit cell and the capacitor type anode unit cell may be used in the same manner as general cathode and anode bicells for a secondary battery.

Hereinafter, an example of the present invention will be described in more detail. It should be noted, however, that the scope of the present invention is not limited by the illustrated example.

Example 1

Lithium cobalt oxide (LiCoO2), as a cathode active material, was applied to aluminum foil, and graphite, as an anode active material, was applied to copper foil, to manufacture a plurality of bicells (cathode bicells having a cathode/separator/anode/separator/cathode stacking structure and anode bicells having an anode/separator/cathode/separator/anode stacking structure). Also, graphite was applied to one major surface of each copper foil to manufacture capacitor type unit cells.

The cathode bicells and the anode bicells are appropriately arranged on a long continuous separation film such that the cathodes and the anodes were opposite to each other at the respective stacking interfaces between the bicells and the capacitor type unit cells, during the stacking of the bicells and the capacitor type unit cells, and the capacitor type unit cells were arranged on a winding end region in the winding direction. After that, the bicells and the capacitor type unit cells were stacked, in the same manner as shown in FIG. 2, to manufacture a hybrid type electrode assembly according to the present invention.

The manufactured hybrid type electrode assembly was mounted in a battery case, and a lithium electrolyte is injected into the battery case, to manufacture a lithium secondary battery.

Comparative Example 1

A lithium secondary battery was manufactured in the same method as Example 1 except that an electrode assembly was manufactured using bicells, not including capacitor type unit cells.

Experimental Example 1

Figure 4:
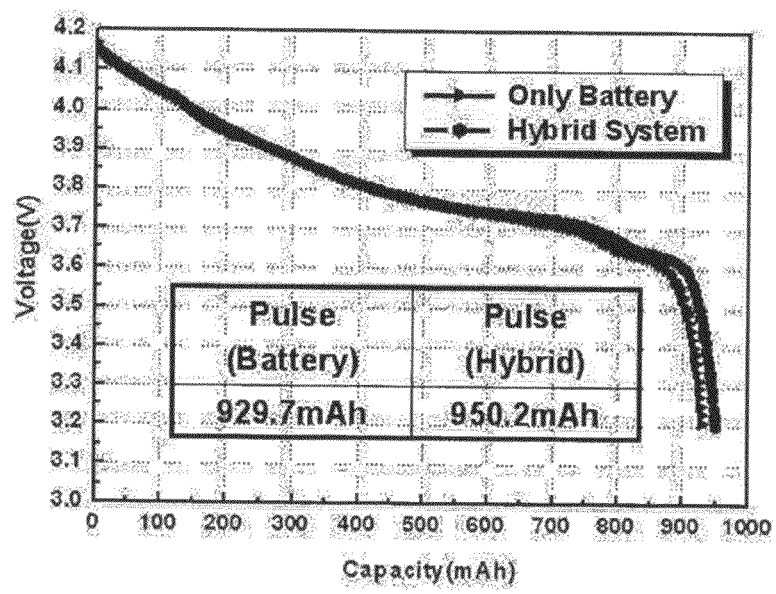
FIG. 4 is a graph illustrating the change in capacity of batteries manufactured according to an example and a comparative example after a GSM pulse discharge is carried out according to Experimental example 1.
Figure 5:
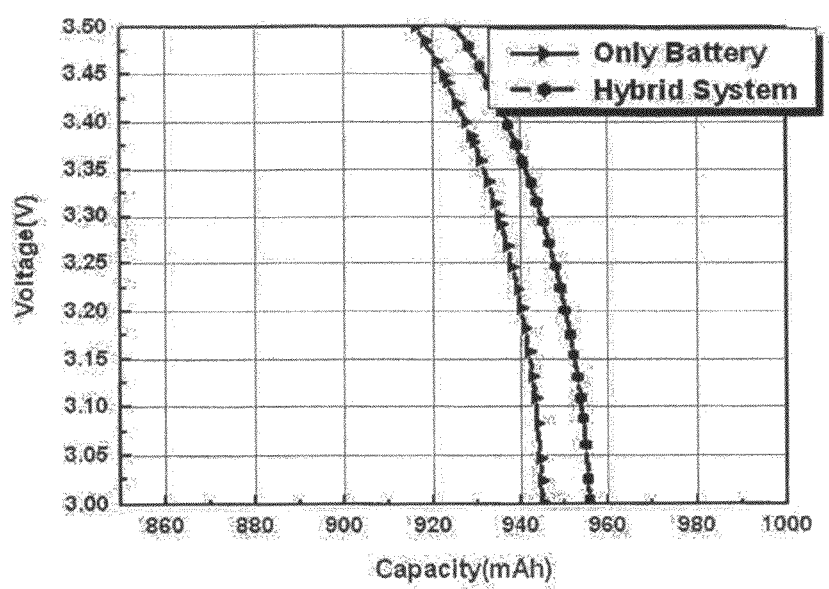
FIG. 5 is an enlarged graph illustrating a region adjacent to a 3V cutoff condition of FIG. 4.

In order to confirm the change in capacity of the respective batteries manufactured according to Example 1 and Comparative example 1, the batteries were charged, until the current of the batteries reached 50 mA, and the batteries were discharged, until the voltage of the batteries reached 3 V in a GSM pulse mode, in conditions in which constant current (CC) is 850 mA and constant voltage (CV) is 4.2 V, to measure the capacity of the batteries. The measurement results are illustrated in FIGS. 4 and 5.

Referring to these drawings, the charge capacity of the battery (Hybrid system) manufactured according to Example 1 was 950.2 mAh, which was greater than 929.7 mAh, the charge capacity of the battery (Only battery) manufactured according to Comparative example 1. Also, the discharge capacity of the battery (Hybrid system) manufactured according to Example 1 was approximately 955 mAh, which was greater than approximately 945 mAh, the discharge capacity of the battery (Only battery) manufactured according to Comparative example 1. Consequently, the measurement results revealed that the secondary battery according to the present invention has excellent characteristics in the GSM pulse discharge mode.

Experimental Example 2

In order to confirm the cycle characteristics and the change in swelling of two batteries manufactured according to Example 1 and Comparative example 1, the batteries were charged and discharged 500 times, in the same conditions as Experimental example 1, to measure the capacity ratio (900 mAh basis) and swelling degree of the batteries. The measurement results are illustrated in FIG. 6.

Figure 6:
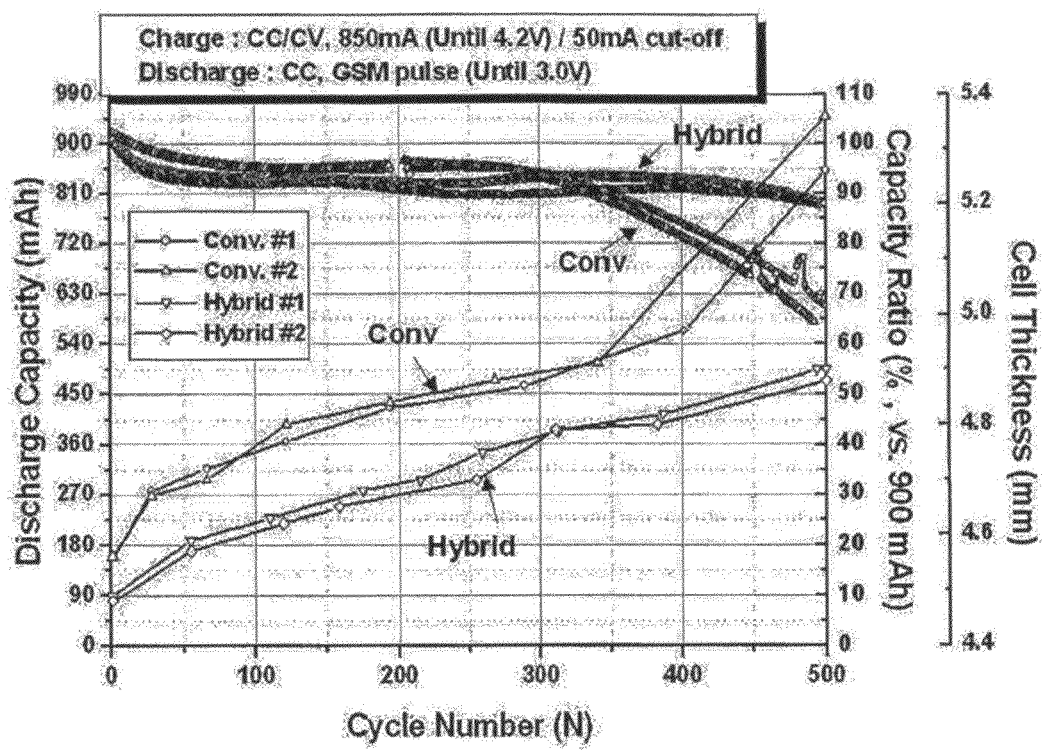
FIG. 6 is a graph illustrating capacity ratio and swelling degree of the batteries manufactured according to the example and the comparative example after Experimental example 2 is performed.

As shown in FIG. 6, the measurement results revealed that the batteries (Hybrid #1 and #2) manufactured according to Example 1 exhibited more excellent cycle characteristics than those of the batteries (Cony #1 and #2) manufactured according to Comparative example 1. Specifically, the serious cycle degeneration of the batteries manufactured according to Comparative example 1 was observed after 300 cycles of the batteries, whereas the discharge capacity of the batteries manufactured according to Example 1 was generally maintained after the above-specified cycles of the batteries. Also, the measurement results revealed that the swelling of the batteries (Hybrid #1 and #2) manufactured according to Example 1 was restrained as compared to those of the batteries (Cony #1 and #2) manufactured according to Comparative example 1. The factors seriously reducing the cycle characteristics of the batteries manufactured according to Comparative example 1 were not found, however, it was inferred that the amount of gas in the batteries was increased due to the decomposition of an electrolyte, and therefore, the capacity of the batteries was reduced, in consideration of a fact that a point of time when the cycle characteristics of the batteries was degenerated approximately coincided with a point of time when the swelling of the batteries was increased.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As apparent from the above description, the present invention provides a hybrid type electrode assembly wherein a coupled system of a capacitor and a secondary battery is embodied in a single cell through a simplified manufacturing process. Consequently, the present invention has the effect of reducing the manufacturing costs of the battery cell and improving the pulse charge and discharge characteristics without the degeneration of capacity.

What is claimed is:

1. An electrode assembly constructed in a stacking/folding structure comprising:
a plurality of independent electrode groups that can be formed into the stacking/folding structure,
wherein the plurality of independent electrode groups are constructed in a structure in which a cathode and an anode are opposite to each other while a separator is disposed between the cathode and the anode, and at least one of the electrode groups is a capacitor type electrode group, and other electrode groups are secondary battery type electrode groups; and
wherein the electrode assembly includes full cell or bicell type unit cells as the electrode groups, and
wherein the electrode assembly is constructed in a structure in which unit cells are sequentially wound, while the unit cells are located on a long separation film, such that the unit cells are stacked, and the uppermost unit cell and the lowermost unit cell of the stacking structure are capacitor type unit cells.

2. The electrode assembly according to claim 1, wherein the capacitor type unit cell is constructed in a structure in which a separator is disposed between a cathode and an anode having a carbon-based material applied to a metal sheet.

3. The electrode assembly according to claim 2, wherein the carbon-based material is graphite and/or active carbon.

4. The electrode assembly according to claim 1, wherein the remaining unit cells for a secondary battery, excluding the capacitor type unit cells, include transition metal oxide, as a cathode active material, and a carbon-based material, as an anode active material.

5. A secondary battery including the electrode assembly according to claim 1.

6. The secondary battery according to claim 5, wherein the battery is a lithium ion polymer battery.

7. The secondary battery according to claim 5, wherein the battery is charged and discharged in a pulse charge and discharge mode.

8. An electrode assembly constructed in a stacking/folding structure comprising:
   a plurality of secondary battery type electrode groups; and
   at least two capacitor type electrode groups;
   wherein the at least two capacitor type electrode groups are located at an uppermost end of the electrode assembly and a lowermost end of the electrode assembly after a final winding process.

9. A secondary battery including the electrode assembly according to claim 8.

10. The secondary battery according to claim 9, wherein the battery is a lithium ion polymer battery.

11. The secondary battery according to claim 9, wherein the battery is charged and discharged in a pulse charge and discharge mode.

\* \* \* \* \*